United States Patent
Mashburn et al.

(10) Patent No.: US 10,528,910 B2
(45) Date of Patent: Jan. 7, 2020

(54) MONITORING AND REPORTING A LIQUID LEVEL OF A COMMODITY IN A TANK

(71) Applicant: Tank Utility, Somerville, MA (US)

(72) Inventors: Nicholas Mashburn, Somerville, MA (US); Nathan Kemper, Virginia Beach, VA (US)

(73) Assignee: Tank Utility, Somerville, MA (US)

( * ) Notice: Subject to any disclaimer, the term of this patent is extended or adjusted under 35 U.S.C. 154(b) by 0 days.

(21) Appl. No.: 15/887,247

(22) Filed: Feb. 2, 2018

(65) Prior Publication Data
US 2018/0225624 A1    Aug. 9, 2018

Related U.S. Application Data

(63) Continuation of application No. 15/092,348, filed on Apr. 6, 2016, now Pat. No. 9,911,095.

(60) Provisional application No. 62/143,363, filed on Apr. 6, 2015.

(51) Int. Cl.
| | |
|---|---|
| *G08B 1/08* | (2006.01) |
| *G06Q 10/08* | (2012.01) |
| *G08C 17/02* | (2006.01) |
| *G06Q 30/06* | (2012.01) |
| *G06Q 10/10* | (2012.01) |

(52) U.S. Cl.
CPC ....... *G06Q 10/087* (2013.01); *G06Q 10/0835* (2013.01); *G06Q 10/1097* (2013.01); *G06Q 30/0635* (2013.01); *G08C 17/02* (2013.01)

(58) Field of Classification Search
CPC ............ G06Q 10/087; G06Q 10/0835; G06Q 10/1097; G06Q 30/0635; G08C 17/02
USPC ........................................................ 340/539.1
See application file for complete search history.

(56) References Cited

U.S. PATENT DOCUMENTS

| | | | | |
|---|---|---|---|---|
| 6,101,451 | A * | 8/2000 | Smith ..................... | G01K 17/06 374/E17.007 |
| 6,336,362 | B1 | 1/2002 | Duenas | |
| 7,289,887 | B2 | 10/2007 | Rodgers | |
| 7,295,919 | B2 * | 11/2007 | Humphrey ............ | G01F 15/061 701/533 |
| 7,304,588 | B2 * | 12/2007 | Ingalsbe ............... | G06Q 10/087 340/870.07 |
| 7,421,265 | B1 * | 9/2008 | Liu ........................ | H01Q 21/30 235/472.01 |

(Continued)

FOREIGN PATENT DOCUMENTS

WO    WO 2013/022621 A1    2/2013

OTHER PUBLICATIONS

[No Author Listed] Communicator EXT 3.0 User Manual V.1.40 Electro Industries/GaugeTech. Jan. 8, 2013, 784 pages.

*Primary Examiner* — Zhen Y Wu

(74) *Attorney, Agent, or Firm* — Wolf, Greenfield & Sacks, P.C.

(57) ABSTRACT

Techniques for monitoring and reporting a liquid level of a commodity in a tank includes measuring a commodity level in the tank using a tank meter and transmitting information indicating the commodity level to a server. A user may access the information from a user interface of a device to view the commodity level of the tank, informing the user of whether the commodity level is low. A provider of the commodity may receive a notification when the tank level is low. Information about the location of the tank may be used to schedule a future delivery of the commodity to one or more tanks.

10 Claims, 6 Drawing Sheets

(56) References Cited

U.S. PATENT DOCUMENTS

| | | | |
|---|---|---|---|
| 7,441,569 B2 | 10/2008 | Lease | |
| 7,512,488 B2 * | 3/2009 | Humphrey | G01F 15/061 701/519 |
| 7,533,703 B2 | 5/2009 | Shuey | |
| 7,937,216 B2 | 5/2011 | Humphrey | |
| 8,079,245 B1 | 12/2011 | Owens et al. | |
| 8,340,909 B2 | 12/2012 | Humphrey | |
| 8,538,591 B1 * | 9/2013 | Klughart | G01F 1/363 700/281 |
| 8,803,683 B2 * | 8/2014 | Schnitz | G06Q 10/08 340/5.61 |
| 8,825,546 B2 | 9/2014 | Baratz | |
| 8,928,473 B2 * | 1/2015 | Gilchrist | B60K 15/04 340/425.5 |
| 8,972,294 B2 | 3/2015 | Baratz | |
| 2006/0015543 A1 * | 1/2006 | Humphrey | G01F 15/061 |
| 2008/0033668 A1 * | 2/2008 | Humphrey | G01F 15/061 702/55 |
| 2008/0275643 A1 * | 11/2008 | Yaqub | G01C 21/343 701/412 |
| 2009/0160674 A1 * | 6/2009 | Vangala | H04Q 9/00 340/870.01 |
| 2010/0164736 A1 * | 7/2010 | Byers | H04L 12/12 340/657 |
| 2010/0326538 A1 * | 12/2010 | Al-Ghamdi | E03B 7/04 137/386 |
| 2011/0173128 A1 * | 7/2011 | Humphrey | G01F 15/061 705/338 |
| 2012/0185197 A1 * | 7/2012 | Lorden | G01F 9/001 702/100 |
| 2012/0316915 A1 * | 12/2012 | Humphrey | G01F 15/061 705/7.25 |
| 2012/0323663 A1 * | 12/2012 | Leach | G06Q 30/0239 705/14.25 |
| 2013/0041795 A1 * | 2/2013 | Baratz | G06Q 10/00 705/34 |
| 2014/0343736 A1 * | 11/2014 | Meyer | G01M 3/18 700/283 |
| 2015/0070007 A1 * | 3/2015 | Kurniawan | G01R 35/00 324/251 |
| 2015/0187195 A1 * | 7/2015 | Ujike | G08B 29/181 340/693.1 |
| 2015/0287313 A1 * | 10/2015 | Silvers | G01F 23/0015 340/618 |
| 2016/0173449 A1 * | 6/2016 | Miller | H04L 12/4633 726/12 |

* cited by examiner

MONITORING AND REPORTING A LIQUID LEVEL OF A COMMODITY IN A TANK

RELATED APPLICATIONS

This application is a continuation of U.S. patent application Ser. No. 15/092,348 entitled "MONITORING AND REPORTING A LIQUID LEVEL OF A COMMODITY IN A TANK, filed Apr. 6, 2016 and claims priority under 35 U.S.C. § 119(e) to U.S. Provisional Patent Application Ser. No. 62/143,363 entitled "MONITORING AND REPORTING A LIQUID LEVEL OF A COMMODITY IN A TANK," filed Apr. 6, 2015, which is incorporated herein by reference in its entirety.

BACKGROUND

The present application relates to apparatus and methods for reporting levels of a liquid commodity such as a liquid fuel for the purpose of informing a consumer when to place an order for additional supply of the liquid commodity.

BRIEF SUMMARY

According to an aspect of the present application, a system for monitoring a commodity stored in a tank is provided. The system comprises a Hall Effect sensor configured to detect a commodity level of the commodity stored in the tank. The system further comprises a transmitter configured to transmit, over a wireless network, information indicating the commodity level. The transmitter is in communication with the Hall Effect sensor. The system further comprises at least one processor and at least one non-transitory storage medium storing processor-executable instructions that, when executed by the at least one processor, control the processor to receive the information indicating the commodity level, store the information indicating the commodity level in association with information identifying a user account corresponding to the tank, and present, on a display of a user device associated with the user account, the information indicating the commodity level to a user.

According to an aspect of the present application a method of reporting commodity amounts stored in a plurality of tanks to a commodity provider is provided. The method comprises monitoring commodity usage for each tank in the plurality of tanks by measuring, using a sensor located in each tank, a commodity level in each tank over time. The method further comprises selecting a subset of tanks from among the plurality of tanks for scheduling of a future delivery by determining whether a current commodity level for a tank in the plurality of tanks is below a threshold level. The method further comprises notifying the commodity provider to include the subset of tanks in a future delivery by transmitting information identifying the subset of tanks to a computing device associated with the commodity provider and presenting information identifying locations and commodity levels associated with the subset of tanks to the commodity provider.

BRIEF DESCRIPTION OF DRAWINGS

Various aspects and embodiments will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application relate to methods and systems for monitoring and reporting an amount of a commodity stored in a tank. The commodity can be a type of commodity used to provide heat including fuel, propane, heating oil, diesel, and/or distillate. A sensor (e.g., a Hall-Effect sensor) located at the tank may detect an amount of the commodity stored in the tank. The sensor may be located on or in the tank and, in some embodiments, may be associated with a gauge of the tank. In some instances, the commodity may be present in the tank in both a liquid and gas form and techniques of the present application may provide measurements of an amount of the liquid commodity in the tank. The detected amount may be reported to a user (e.g., consumer of the commodity, commodity supplier), allowing the user to monitor the amount of the commodity stored in the tank without the user viewing the gauge on the tank. Such techniques may provide benefits to both consumers of the commodity and suppliers of the commodity. The reported commodity levels may allow consumers to make an informed decision when ordering additional commodity. A supplier of the commodity may receive a notification of the commodity amount stored in the tank and may schedule future deliveries based on the commodity amount.

Measurements from a sensor (e.g., Hall-Effect sensor) may indicate a low liquid level of commodity in a consumer's tank. A low liquid level may be determined when a liquid level detected by the sensor is less than a threshold level, such as the tank is less than half or a quarter full. The threshold level may be a predetermined parameter and/or a configurable parameter. In some embodiments, the threshold level may correspond to a certain volume of liquid in the tank by determining the threshold level from the dimensions of the tank and/or the volume capacity of the tank. In some embodiments, the threshold level may correspond to an expected amount of time to use of the remaining liquid by the consumer. A consumer, a provider, and/or a supplier of the commodity may set the threshold level.

When a low liquid commodity level is detected by a sensor, information related to costs associated with adding more of the commodity to the tank may be presented to the consumer through a user interface on a device as a display. Such information may include a volume of liquid needed to completely refill the tank and/or price quotes from one or more providers of the commodity. The consumer may place an order to one of the commodity providers to provide additional commodity. By having multiple price quotes available, the consumer can make an informed decision about which provider to purchase from.

Figure 1:
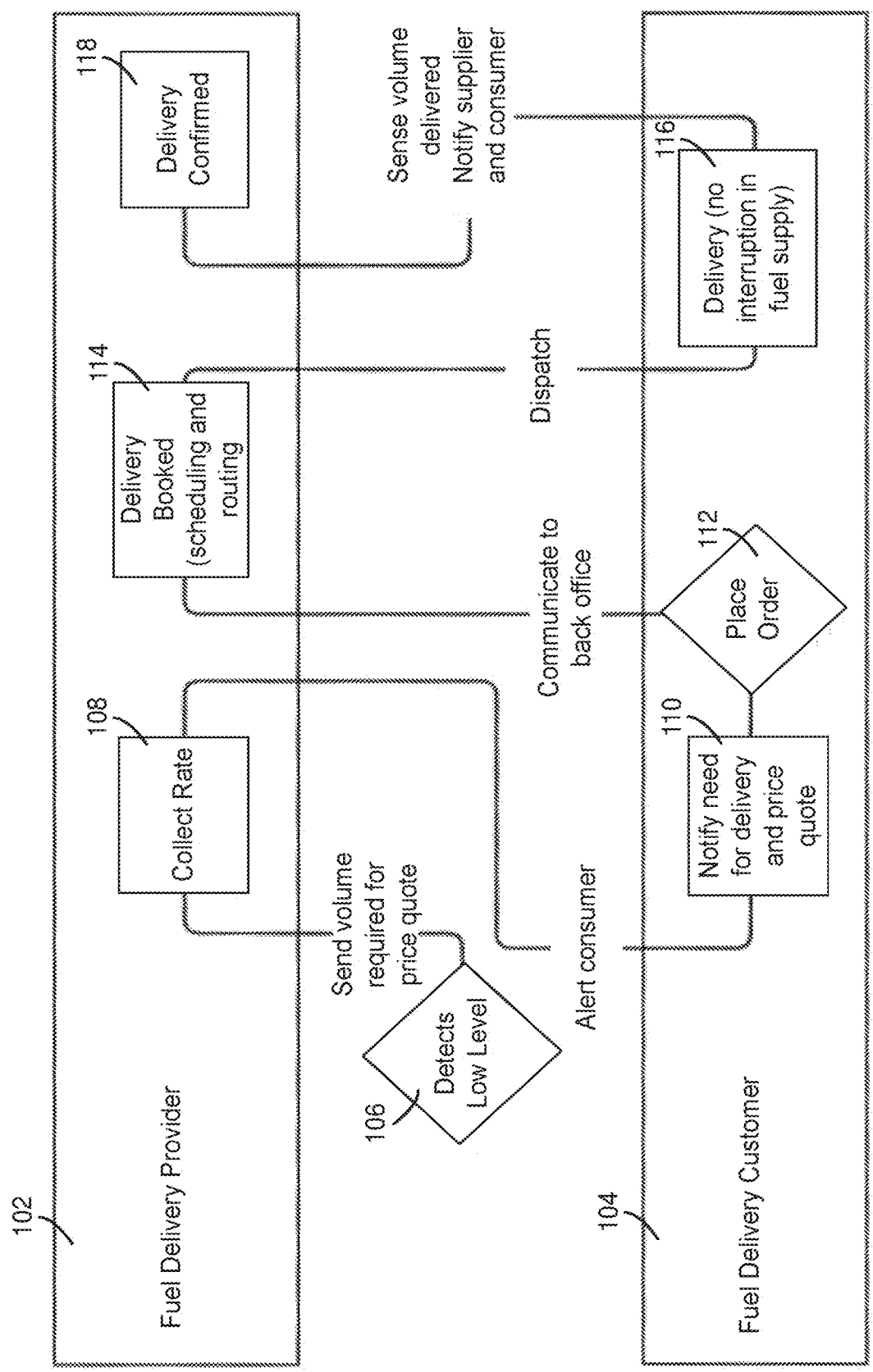
FIG. 1 is a flowchart illustrating an exemplary embodiment of a method that may be utilized in providing a consumer with price quotes and placing a fuel order.

In some embodiments, commodity level information provided by a tank meter may facilitate a consumer placing an order for additional commodity (e.g., fuel) to refill the tank. FIG. 1 illustrates an exemplary embodiment of a method that includes providing a consumer 104 with price quotes and placing a fuel order, by the consumer, to a fuel delivery provider 102. A sensor located at a tank of the customer 104 may detect a low level at act 106. The low level may indicate a low amount of fuel in the tank. A volume of fuel in the tank may be determined based on the detected low level in the tank and the capacity of the tank. The tank capacity may be identified by the dimensions of the tank and/or the volume of fuel the tank can hold when completely full. The extent to which the tank is empty may be identified by a volume determined by the tank capacity and the volume of fuel in the tank.

A volume of fuel to fill the tank may be determined based on the detected low level, and the volume may be sent to one or more fuel delivery providers 102. Price information may be collected including rates, price quotes, and price trends for a provider 102. In the example illustrated in FIG. 1, rate information for a fuel delivery provider is collected at act 108 and transmitted to a consumer device. A consumer may receive rate information from one or more fuel delivery providers, alerting the consumer to various options for refilling the tank. A consumer may decide which fuel delivery provider to place an order with to refill the tank based on the rate information for multiple providers, such as different rates. Other information related to a fuel delivery provider may be transmitted to a consumer that may inform the consumer's decision-making process regarding which provider to order from. In some embodiments, information related to the provider's availability in their delivery schedule, such as the next available date to deliver fuel to the consumer, may be transmitted to the consumer.

The consumer may notify a fuel delivery provider, via a consumer device, to request a fuel delivery and/or a price quote at act 110. The consumer may place an order with the fuel delivery provider by act 112. The consumer's order information, including a price quote request and/or requests related to the scheduling of the delivery, may be communicated to the fuel delivery provider, and the provider may schedule the delivery at act 114.

Scheduling of the delivery by the fuel delivery provider may be based on the volume of fuel ordered by the consumer and/or the location of the tank. The provider may identify a delivery schedule and/or delivery route to fulfill orders for multiple consumers by reducing costs associated with delivering the commodity. In some embodiments, determining a schedule for delivery of a commodity may be based on a distance traveled to the location of the tanks for the multiple consumers. A provider delivering the fuel to the multiple consumers may reduce costs and improve speed of delivering the fuel by following a schedule that reduces a distance traveled to make the multiple deliveries. As an example, consumers with tanks geographically located in proximity to each other may have their fuel delivered by the same provider. Additionally or alternatively, a delivery may be scheduled based on the volume of fuel in the tank as reported by the tank sensor. A fuel delivery may be scheduled such that there is no interruption in the consumer's fuel supply. There may be a critical level of the tank that below which would interrupt the consumer's fuel supply. A fuel delivery may be scheduled such that the fuel level in the tank does not reach below the critical level.

The fuel delivery provider may dispatch a supplier to make a fuel delivery at act 116. The fuel delivery may be made such that the tank is refilled before there is an interruption in the fuel supply. The tank sensor may also measure a commodity level of the tank and/or determine a commodity volume in the tank after a delivery. Information related to an amount of fuel in the tank after the fuel delivery may be transmitted to the consumer, the supplier, and/or the provider. The provider may confirm that the delivery was made at act 118.

Figure 2A:
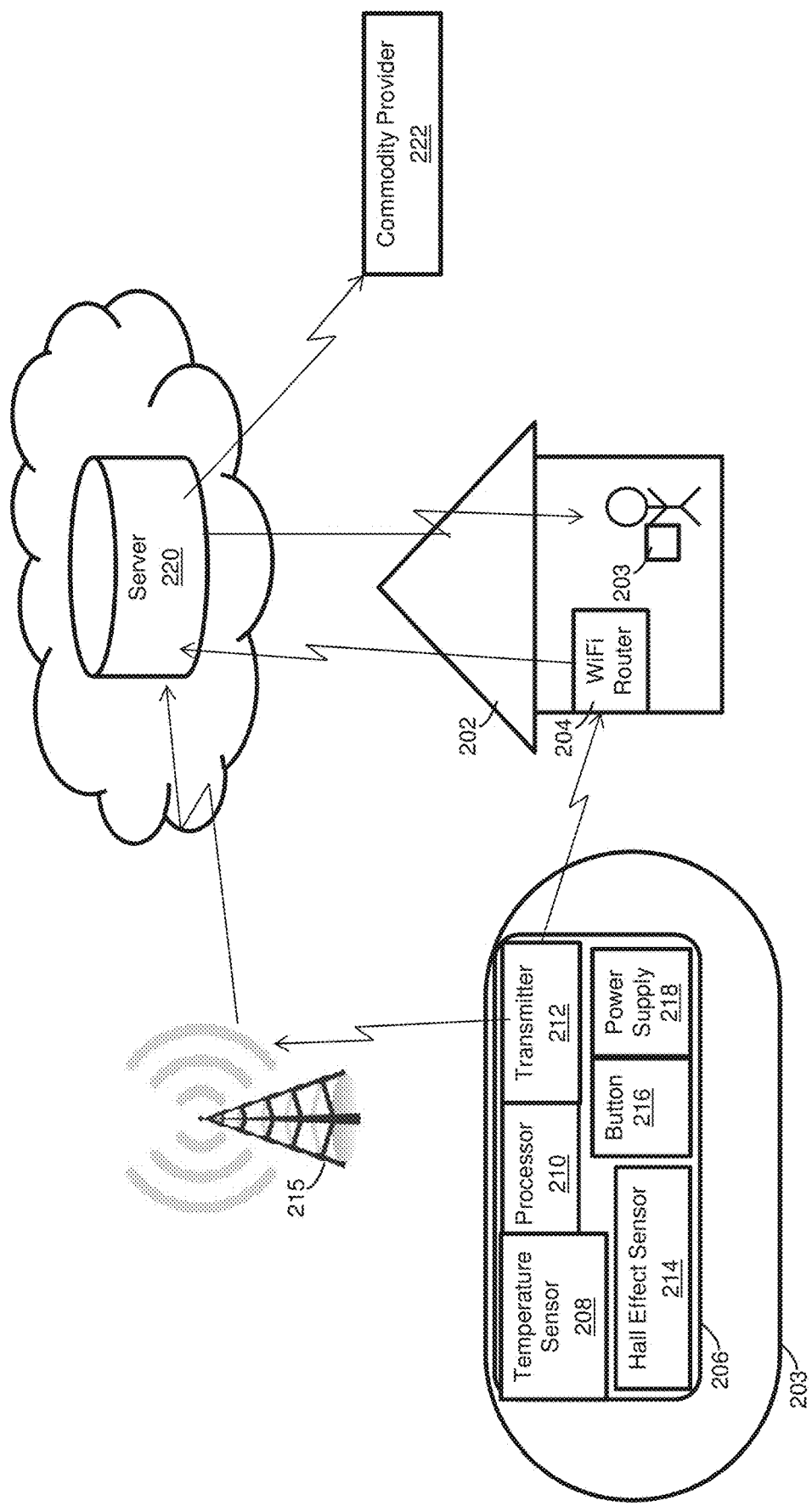
FIG. 2A is a schematic of a system that includes a tank meter, according to some embodiments.

Some embodiments relate to a tank meter that detects and measures a liquid level from a tank, such as a propane tank. A block diagram illustrating an exemplary system for monitoring a tank and reporting a commodity level to a consumer and/or commodity provider is illustrated in FIG. 2. The tank 203 with tank meter 206 may be located proximate to building 202 of a consumer and may provide the commodity (e.g., fuel) to the building 202. Tank meter 206 located at a tank may comprise a sensor such as Hall Effect sensor 214 configured to provide an electrical signal to a device that converts the electrical signal into a liquid level for the tank. Examples of suitable sensors for measuring a liquid level are available from Rochester Gauges, Inc. and described in U.S. Pat. No. 6,679,116 entitled "LIQUID LEVEL GAUGE WITH REMOVABLE HALL DEVICE."

The tank meter may include a transmitter 212 configured to transmit information indicating the commodity level in the tank over a wireless network to server 220. The transmitter 212, in communication with the Hall Effect sensor 214, may receive information indicating the commodity level. The transmitter may be configured to transmit the information indicating the commodity level over the wireless network automatically when the transmitter is connected to the wireless network. In some embodiments, the transmitter 212 is configured to transmit information indicating the commodity level over a wide area network, such as cellular data network 215, to server 220. In some embodiments, the transmitter 212 is configured to transmit information indicating the commodity level over a local area network associated with building 202. Building 202 may receive the commodity from the tank. A router configured to provide the local area network may transmit the information indicating the commodity level to server 220. As an example, the transmitter may be a WiFi module configured to transmit the liquid level of server 220 over a local wireless network. The wireless network may be associated with the building of a consumer, such as WiFi router 204 associated with building 202 in proximity to tank 203.

In some embodiments, a sensor configured to detect other metrics related to an amount of a commodity in the tank (e.g., pressure) other than a liquid level may be provided. The sensor may be used instead of and/or in addition to a liquid level sensor. Such a sensor may be used to determine an amount of a commodity when the commodity is in a gas or solid phase.

Information indicating the commodity level may be stored on server 220 associated with a user account corresponding to tank 203. Settings associated with the user account may include information identifying a capacity and/or dimensions of tank 203, type of commodity stored in tank 203 (e.g., propane, oil), the orientation of tank 203 (e.g., horizontal, vertical), location of tank 203 (e.g., address of building 202). Settings of the user account may include a threshold level provided by a user, which can be used to determine whether the commodity amount in the tank 203 reaches a low level. Connectivity credentials used to connect to a wireless network may be stored in association with the user account. A user may create the account during installation of the tank meter 206 and input one or more settings into the user account. A unique identifier of tank meter 206 may act to uniquely associate the tank meter 206 with the user account such that the settings stored in association with the user account are used to analyze information received from tank meter 206.

Information stored on server 220 may be accessed by the consumer and/or provider through any suitable device configured to communicate with the server. As illustrated in FIG. 2, consumer device 203 may access information related to measurements made by tank meter 206. Examples of consumer devices may include phones, tablet computers, laptops, and/or desktop computers. In this manner, the consumer can view previous and current tank liquid levels and track usage of the commodity. For example, a consumer may access information related to measurements obtained by a tank meter including liquid level and tank status stored on server 220 though one or more devices that connect to the Internet. Commodity provider 222 may determine price quotes and/or schedule a delivery based on the information stored on server 220.

As shown in FIG. 2, tank meter 206 may comprise components to facilitate measuring and monitoring of the commodity level. As discussed above, tank meter 206 located at a tank may include Hall Effect sensor 214. Hall Effect sensor 214 may provide an indication of the liquid level in the tank. The liquid level may be reported as a percentage, a volume, a length, a height, and/or in any suitable way to report a liquid level in a tank. Tank meter 206 may include one or more temperature sensors 208. Temperature sensor 208 may measure an ambient temperature inside the tank, and the tank meter may determine the liquid level and/or volume of fuel in the tank based on the measured temperature inside the tank. The temperature inside the tank may be used to correct for any volume changes in the liquid. Additionally or alternatively, temperature sensor 208 may be positioned to measure the temperature outside the tank. The temperature outside the tank may provide an indication of the weather conditions near the tank. The outside temperature sensor may be configured as a freeze protection mechanism. Pipes configured to deliver fuel from the tank to an intended building may freeze when the outside weather is below a certain temperature value. Measurements obtained by the outside temperature sensor may indicate weather conditions that may lead to frozen pipes. An alert may be transmitted to the consumer or other resident of the building that the outdoor temperature may increase the likelihood of the pipes freezing. Additionally or alternatively, the outside temperature measurements may relate to usage of the fuel in the tank by the consumer. Scheduling a delivery for additional fuel may be based on one or more outside temperature measurements such that the delivery is made prior to depletion of fuel from the tank. As an example, the outside temperature may indicate that the weather conditions are colder, which may relate to the consumer consuming more fuel than a usual amount. A fuel delivery may be scheduled for an earlier time to refill the tank, ensuring the consumer's fuel supply is not interrupted despite the colder weather conditions. In some embodiments, as sensor outside the tank may be located inside the building to provide an indication of the functioning of the heating system of the building.

Tank meter 206 may include a processor 210 configured to process information related to the measurements obtained by the sensors, including the Hall Effect sensor 214 and/or the one or more temperature sensors 208. When performing a measurement, Hall Effect sensor 214 may obtain an electrical signal such as a voltage or current signal. Processor 210 may be configured to convert the electrical signal into information related to a liquid level of the tank based on the electrical signal. Tank meter 206 may include a transmitter for transmitting information related to sensor measurements to an external device. The external device may be server 220 which may be configured as a cloud storage device. In some embodiments, information related to sensor measurements may be transmitted to server 220 through a network connection provided by another transmitter proximate to the tank meter. Building 202 associated with the tank may have an existing network connection such as a WiFi connection established through WiFi router 204. The tank transmitter may be configured to locally transmit information to communicate with the building's network connection to transmit the information to server 220. The transmitter may include WiFi module 212 to transmit information over a WiFi network of building 202. By transmitting information to a locally accessible network, power usage may be reduced, and the power supply may be conserved because the power required to power a wide area network transmitter is typically greater than a local area network transmitter.

Tank meter 206 may include power supply 218 configured to provide power to components that comprise the tank meter 206 including Hall Effect sensor 214 and temperature sensors 208. Power supply 218 may be a battery power supply. To conserve and prolong the lifetime of the power supply, tank meter 206 may be configured to periodically turn on, perform one or more measurements, process the measurements, and may transmit information related to the measurements based on the processing. Tank meter 206 may be configured to draw power from the power supply 218 and turn on at certain time intervals. The time intervals may be configurable by a user of the tank meter, such as a consumer, manufacturer, provider, and/or supplier. In some embodiments, settings associated with a user account may indicate the time interval for the Hall Effect sensor 214 to collect information by turning on periodically.

As illustrated in FIG. 2, tank meter 206 may include button 216 configured as an interrupt switch which allows for reset, enter, and listen operating modes of the tank meter. The reset operating mode may cycle tank meter 206 through states of collecting data from Hall Effect sensor 214 and transmission of the information by transmitter 212. The listen operating mode may trigger the tank meter 206 to look for network connectivity status and/or network connectivity credentials (e.g., WiFi password). The enter mode may turn tank meter 206 on and off, such as by disconnecting and connecting power supply 218. A user may depress the button 216 to switch between the different operating modes. In some embodiments, tank meter 206 may include a magnetic sensor positioned at tank 203. Magnetic sensor may receive a signal indicating a change in operating state of the tank meter 206 when a magnet is positioned proximate to the magnetic sensor. In this manner, a user may position a device with a magnet outside the tank and proximate to the tank meter 206 to control the operating state of the tank meter 206. The magnetic sensor may provide similar functionality as button 216. The magnetic sensor may be configured as an interrupt switch, which allows for reset, enter, and listen operating modes of the tank meter 206. In some embodiments, the magnetic sensor may be formed on a component of the tank meter configured to be positioned outside of the tank when the tank meter is installed. The magnetic sensor may couple to other components of the tank meter (e.g., Hall Effect sensor) through one or more cables.

In some embodiments, visual indicators (e.g., LEDs) associated with the tank meter 206 may provide an indication of a status of the tank meter 206. A visual indicator may provide an indication of the connectivity status of transmitter 212 to the wireless network, such as whether the transmitter can send information over the wireless network. A visual indicator may provide an indication of transmission over a wireless network of information indicating a commodity level of tank 203 detected by Hall Effect sensor 214. A visual indicator may provide an indication of the power status of the tank meter 206.

Figure 2B:
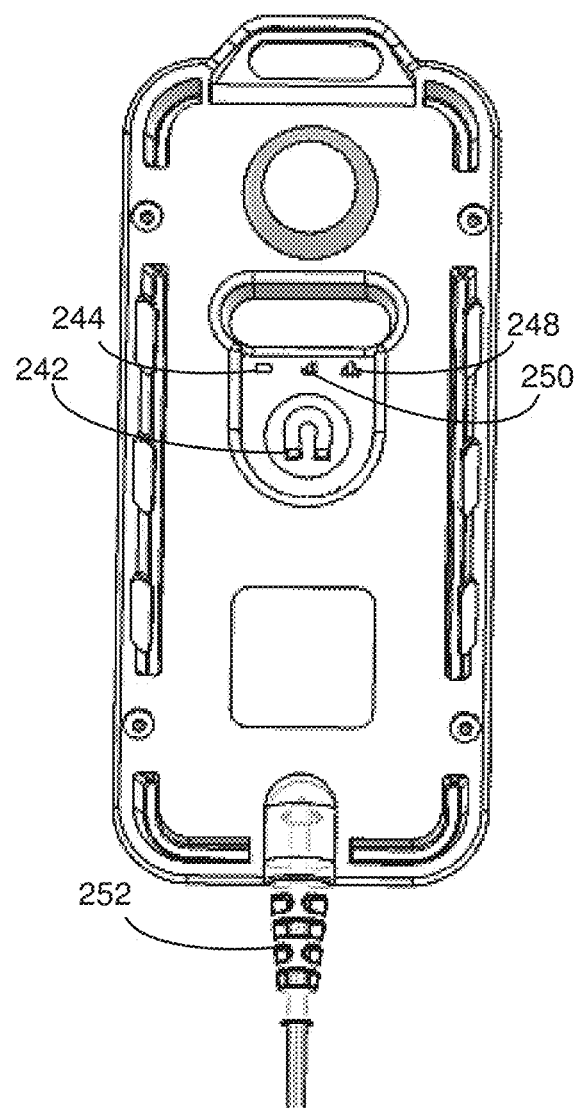
FIG. 2B is an exemplary component of a tank meter.

Components of the tank meter may be positioned outside and/or inside a tank after installation. In some embodiments, a magnetic sensor and one or more visual indicators may be positioned outside of the tank to improve accessibility to a user. A user may position a magnet in proximity to the magnetic sensor to change an operating state of the tank meter. The one or more visual indicators may provide feedback to the user of the operating state of the tank meter and/or connectivity status of the transmitter. FIG. 2B is an exemplary component of a tank meter configured to be positioned on the outside of a tank and coupled to a Hall Effect sensor through a cable 252. The component includes a magnetic sensor, indicated by graphic 242, and visual indicators 244, 248, and 250. A user may hold a magnet proximate to graphic 242, which may provide a signal to the tank meter to change an operating mode. Visual indicators 244, 248, and 250 may include light-emitting diodes (LEDs) illuminating an opening having a shape identifying the type of signal indicated by the visual identifier. Visual identifier 244 has a shape representative of a battery and may provide an indication of the battery status (e.g., whether the battery needs to be replaced). Visual identifier may provide an indication of whether information has been successfully transmitted over a wireless network to another computing device, such as server 220. Visual identifier 250 has a shape representative of connectivity strength bars and may provide an indication of the strength of the wireless network accessible by the transmitter of the tank meter.

Some embodiments relate to methods for installing a tank meter, including tank meter 206 shown in FIG. 2. The method may include operating a user device, such as a handheld device, to provide input into a software application. A user may install the application on the user device and the application may provide instructions for how to install the tank meter to the tank, including how to connect the tank meter to a gauge of the tank and obtain a reading with the Hall Effect sensor on the tank meter. In embodiments where the tank meter has a magnetic sensor, a user may position a magnet proximate to the tank meter and the magnetic sensor may detect the magnet and switch the tank meter to a listen operating state where the tank meter is attempting to establish connectivity with a wireless network. A user may create a user account using the application to provide connectivity credentials for the wireless network. Tank meter may access those connectivity credentials, such as by associating a unique identifier of the tank meter with the user account, and use the connectivity credentials to transmit information over the wireless network. A user may provide input changing the connectivity credentials through a user interface of the application. A user may also access information indicating the commodity level of the tank using the application. The application may visually present the information on a display of the user device such that the user can view information indicating a current and/or previous commodity level of the tank.

Some embodiments relate to methods for facilitating purchases by a consumer for additional quantities of a commodity such as propane, oil, or other liquid commodity. A tank meter may monitor a level of liquid in a consumer's tank as the liquid commodity is consumed. Price information related to costs and rates for ordering additional amounts of the commodity may be presented to the consumer. The consumer may be in a position to select a specific fuel provider based on the price information rather than rely on the same provider for subsequent refills. Although these methods may be implemented by reporting a low level of the commodity to a consumer, these techniques may be implemented when the tank is not reported as being at a low level of the commodity. These techniques may also allow a consumer to select a delivery when the price of the commodity is at a particular price and/or rate. Such techniques may be advantageous to the consumer by saving the consumer money. As an example, a consumer may decide to place an order when a fuel price is lower than an average value, although the consumer's tank is not at a low level. By requesting a delivery when the price is low, the consumer may save money on overall fuel costs.

Figure 3:
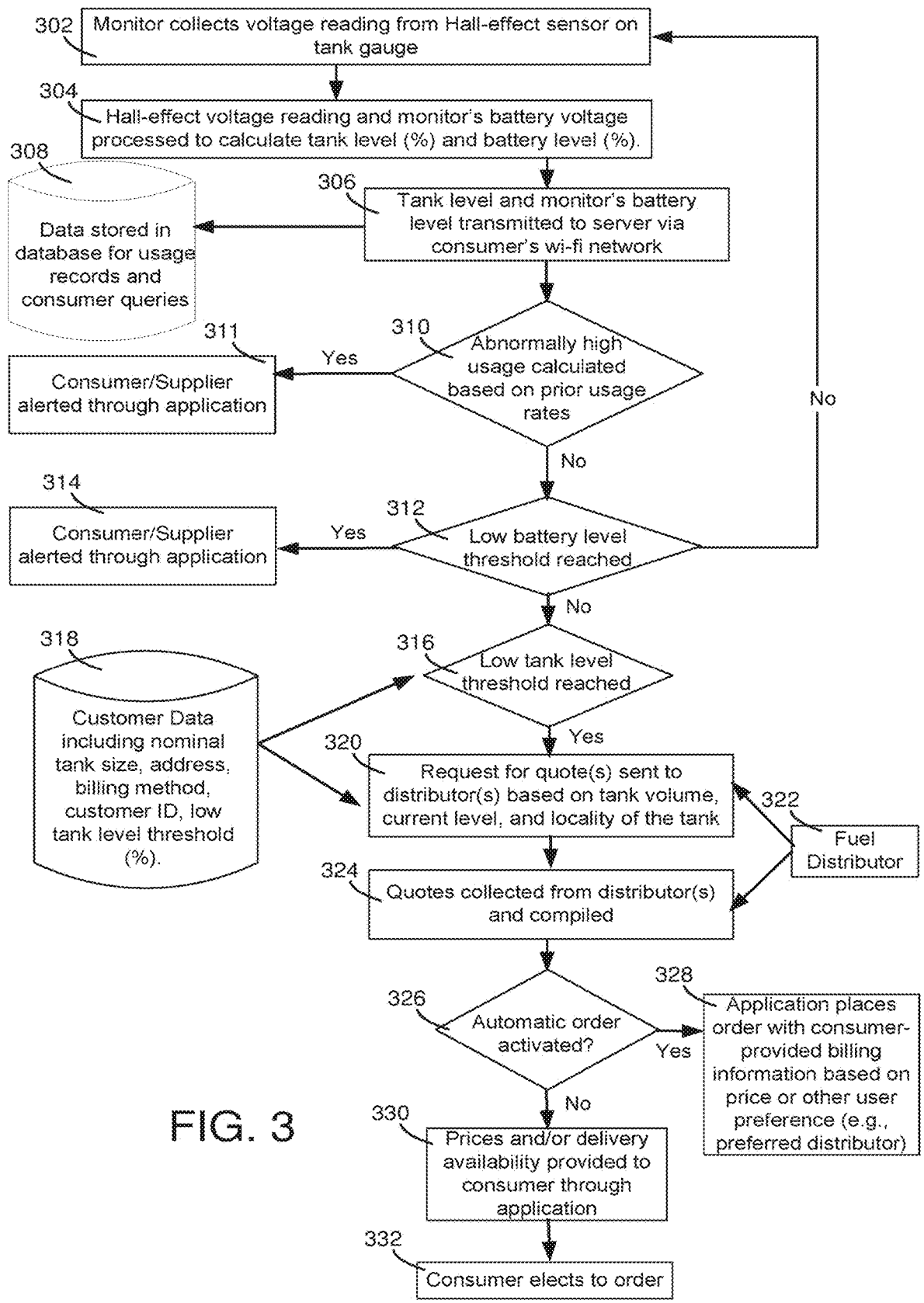
FIG. 3 is a flowchart illustrating an exemplary embodiment of a method that may be utilized in providing a consumer with price quotes and placing a fuel order.

FIG. 3 illustrates an exemplary embodiment of a method that includes monitoring of a liquid level in a tank and requesting quotes from one or more distributors. Monitoring of the liquid level by act 302 may be performed by a tank meter having a Hall Effect sensor. The Hall Effect sensor may be configured to be positioned on the tank gauge and provide a voltage signal. The voltage signal may provide an indication of the level of the liquid in the tank at act 304. The commodity level (e.g., tank level) may be reported in any suitable manner, including a percentage value and voltage value. Additionally, a power supply level of a power supply providing power to the tank meter may obtained by the tank meter at act 304. The power supply may be a battery, and a voltage signal related to the voltage of the battery may be measured by the tank meter. The power supply level may be reported in any suitable manner, which may include a percentage value.

Information indicating the tank's liquid level and/or the power supply level may be transmitted to a server over a wireless network at act 306. The transmitted information indicating the tank's liquid level may include a voltage value (e.g., a voltage measured by a Hall Effect sensor). In some embodiments, information indicating a voltage signal may be transmitted to the server over a wireless network, and a tank level (e.g., percentage the tank filled with the commodity) corresponding to the voltage value may be determined by the server or other computing device, such as by using a tank capacity associated with the tank. Transmission of the information may include transmitting to the server via a WiFi network proximate to the tank, such as a WiFi network associated with the consumer's residence or other nearby building. In some embodiments, transmission of the information may include transmitting to the server over a cellular data network. The commodity level and the power supply level may be stored in one or more databases in communication with the server at 308. The one or more databases may be configured to provide commodity usage information in response to a consumer query such as trends in fuel usage by a consumer over time.

Additionally or alternatively, the server may process commodity level information and power supply information to determine a status of the tank meter and/or identify alerts to report to a consumer and/or supplier. Usage of the commodity may be evaluated based on prior usage rates at act 310. When there is a higher usage rate, an alert may be reported to a consumer and/or supplier of the commodity. A higher usage rate may be a usage rate that is above an average usage rate. The power supply level may be compared to a threshold level by act 312. If the power supply level is less than a threshold value, then an alert may be reported to a consumer and/or supplier at act 314. The alert may indicate to the consumer and/or supplier to replace a battery of the tank meter. The commodity level may be compared to a threshold value to identify whether the tank is at a low commodity level at act 316. Consumer data stored in one or more databases may include information related to the size of the tank, location of the tank such as the consumer's address, a billing method selected by the consumer, identification information such as a customer ID, and/or a low commodity level threshold value such as a percentage value. The consumer data may be stored associated with a user account for the consumer. The commodity level threshold value may be a configurable parameter and/or a prescribed value based on information related to the tank such as the tank's capacity size.

When the commodity level is below a threshold value, quotes from one or more distributors of the commodity may be retrieved and presented to the consumer. A request for one or more quotes may be sent to one or more distributors of the commodity of interest at act 320. Information such as the tank's volume or capacity, a current commodity level, and the geographical location of the tank may be provided to the one or more distributors 322. A distributor may provide a price quote for providing additional commodity based on this additional information. Price quotes collected from the one or more distributors may be compiled at act 324. In some embodiments, an automatic order for the additional commodity may be provided as an option to a consumer. If an option for automatically placing an order is identified as being activated at act 326, an order may be automatically placed at act 328. The order may include consumer-provided billing information based on price and/or other preferences (e.g., preferred distributor). If an automatic order option is not selected, then the price quotes and/or delivery availability may be presented to a consumer at act 330. The consumer may then select an order based on the one or more price quotes at act 332.

In some embodiments, a consumer may receive quotes from one or more distributors of the commodity regardless of whether the tank level has reached a level below a threshold level. The consumer may request price quotes from distributors, and the distributors may determine price quotes using information associated with the consumer's account including the tank's capacity and/or dimensions, a current commodity level, and the geographical location of the tank. The price quotes may be retrieved, compiled, and presented to the consumer prior to the tank reaching a low level, which may allow the consumer to decide whether to request a delivery at a lower price than if the consumer waited at another time when the tank is at a low level.

Some embodiments relate to methods for reporting to a provider commodity amounts stored in different tanks, such as tanks associated with different customers of the provider. Usage of the commodity for the each of the different tanks may be monitored by measuring a commodity level in each tank over time, such as by using tank meter 206. In some embodiments, the provider may receive notifications of when a tank has a low commodity level and may use this information to determine a future delivery to the tank. A subset of tanks may be selected from among the multiple tanks by determining whether a current commodity level for the tank is below a threshold level. The subset of tanks may be identified for scheduling of a future delivery by the commodity provider. The commodity provider may be notified of the subset of tanks that have a commodity level below a threshold level by transmitting information identifying the subset of tanks to a computing device associated with the provider. The information may be presented to the provider by identifying the locations of the subset of tanks and the commodity levels associated with the subset of tanks. In some embodiments, a user associated with a tank may request delivery of the commodity and the subset of tanks may be selected to include the tank associated with the request.

A schedule for delivering the commodity to the subset of tanks may be determined based on the locations of the tanks identified has having a low commodity level. Information identifying the locations associated with the subset of tanks having a low commodity level may be retrieved from user account settings including an address provided by the user. In some embodiments, determining a schedule may include calculating estimated costs associated with different schedules for delivering the commodity to the different tanks identified as having a low commodity level. A schedule may be selected based on whether the schedule has the lowest estimated cost, which may reduce costs associated with delivering the commodity for the provider. In some embodiments, a group of tanks can be identified as being geographically located in proximity to one another based on the locations of the tanks. Determining a schedule may include identifying a group of tanks by estimating distances for the provider to travel to the locations of the tanks and selecting a group of tanks that are located in proximity to one another based on the estimated distances. The provider may determine a schedule that allows for deliveries to the group of tanks to be combined within the same duration of time (e.g., on the same day). Information from sources other than a user account may be used to determine a delivery schedule. Travel time information (e.g., speed limits, average speed, traffic alerts) may be received, such as from a mapping program (e.g., GOOGLE MAPS) accessible via the Internet. The travel time information may be used to calculate estimated costs associated with different schedules.

Figure 4:
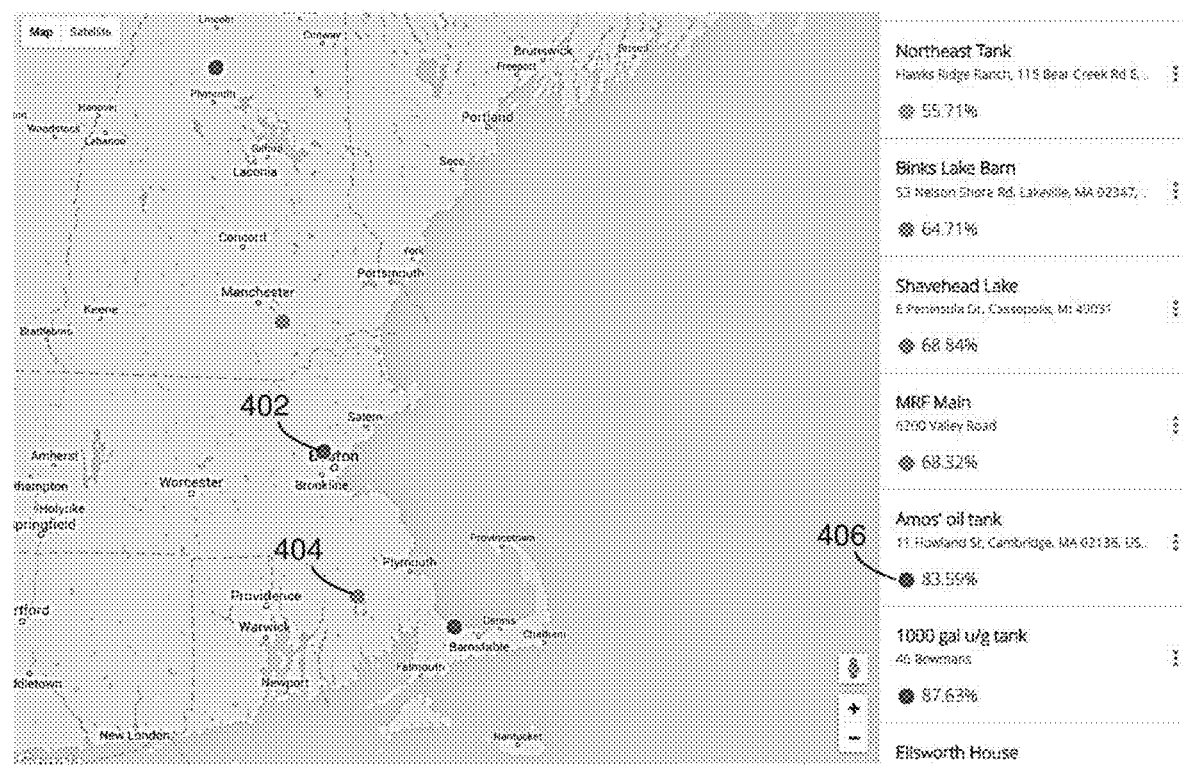
FIG. 4 is an image of a map identifying locations of tanks, according to some embodiments.

Information identifying locations associated with tanks may be presented to a user by presenting a visual representation of the locations of the tanks on a map. The visual representation may be presented on a display of a computing device associated with the provider. FIG. 4 is an exemplary visual representation of a map illustrating locations of tanks by identifiers 402 and 404 positioned on the map corresponding to the locations associated with the tanks. A legend associated with the different identifiers may provide address information and/or the commodity level associated with each tank. As shown in FIG. 4, identifier 402 corresponds to entry 406 of the legend, which indicates that identifier 402 is for "Amos' oil tank" and has a commodity level of 83.59%. In some embodiments, an identifier may indicate an amount of commodity stored in a tank at the location. The identifier may be depicted in a color corresponding to a commodity level. The color may be one of a range of colors corresponding to a range of commodity levels (e.g., 0% to 100% full). FIG. 4 is a grayscale conversion of a color image and the gray values associated with circular identifiers 402 and 404 correspond to representations of different commodity levels for the tanks at the locations of 402 and 404.

Figure 5:
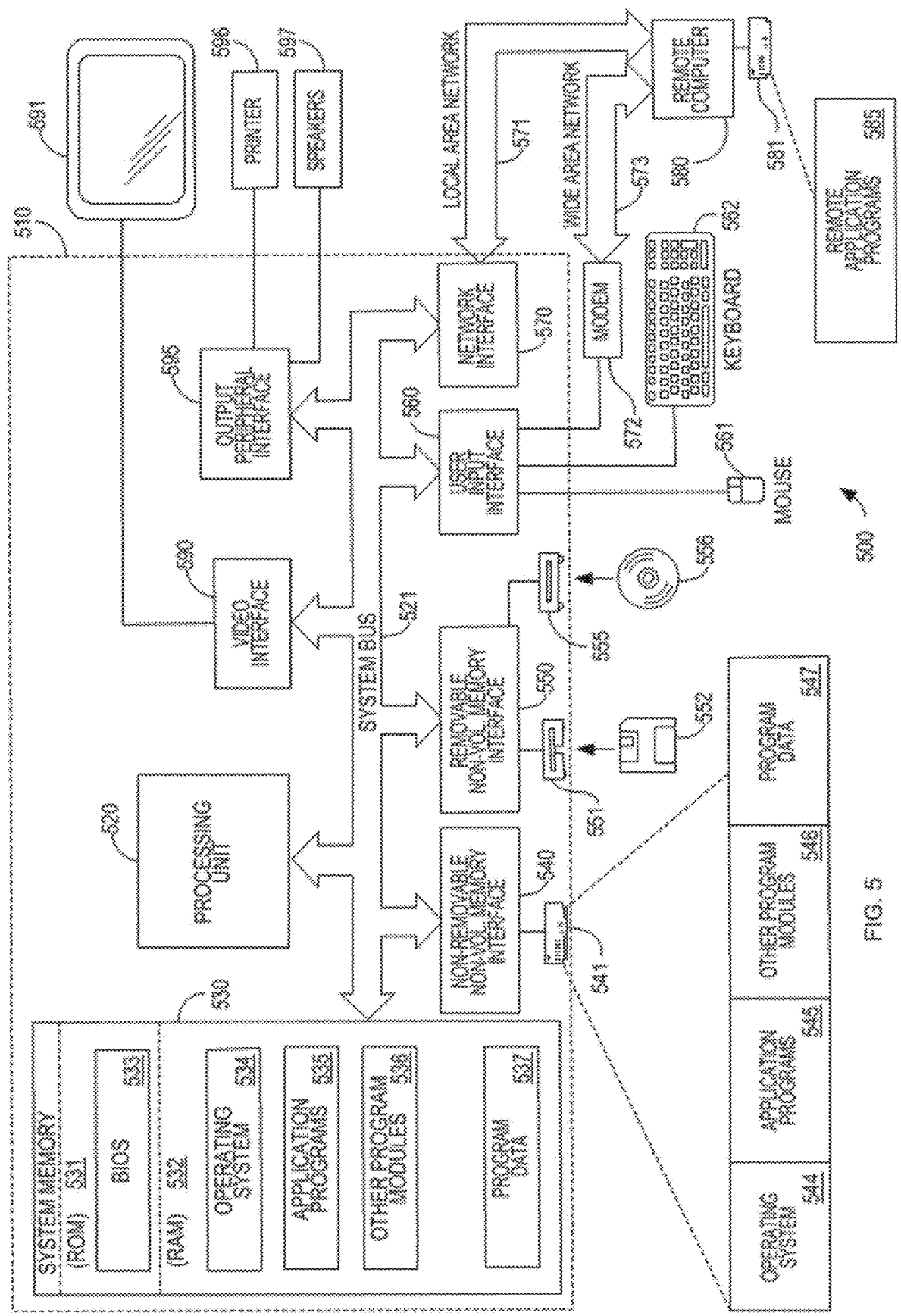
FIG. 5 is a block diagram of an exemplary computer system on which some embodiments may be implemented.

A server in accordance with the techniques described herein may take any suitable form, as embodiments are not limited in this respect. An illustrative implementation of a computer system that may be used in connection with some embodiments is shown in FIG. 5. One or more computer systems such as computer system 500 may be used to implement any of the functionality described above. A server may have some or all of the components illustrated in FIG. 5.

A device that a consumer may use to perform functions such as accessing information stored on the server and placing an order may be any suitable device having a user interface to accept input form the consumer. An illustrative implementation of a computer system that may be used as a consumer device in connection with some embodiments is shown in FIG. 5. A consumer device may have some or all of the components illustrated in FIG. 5.

A device that a provider may use to perform functions such as receiving information indicating a commodity level of a tank and presenting the location of the tank to a provider may be any suitable device having a user interface, such as a display. An illustrative implementation of a computer system that may be used as a provider device in connection with some embodiments is shown in FIG. 5. A provider device may have some or all of the components illustrated in FIG. 5.

FIG. 5 illustrates an example of a suitable computing system environment 500 on which the embodiments may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The embodiments are operational with numerous other special purpose computing system environments or configurations. Examples of well-known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The embodiments may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the embodiments include a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be considered to be within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through an non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through a output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the described embodiments are indicated, it should be appreciated that not every embodiment will include every described advantage. Some embodiments may not implement any features described as advantageous herein and in some instances. Accordingly, the foregoing description and drawings are by way of example only.

Various aspects of the described invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The invention claimed is:

1. A method of reporting commodity amounts stored in a plurality of tanks to a commodity provider, the method comprising:
   monitoring commodity usage for each tank in the plurality of tanks by measuring, using a sensor located in each tank, a commodity level in each tank over time;
   selecting a subset of tanks from among the plurality of tanks for scheduling of a future delivery by determining whether a current commodity level for a tank in the plurality of tanks is below a threshold level;
   determining, by the commodity provider, at least one tank of the plurality of tanks as having a current commodity level as not being below the threshold level to include in the future delivery based, at least in part, on proximity of the at least one tank to one or more tanks of the subset of tanks; and
   notifying the commodity provider to include the subset of tanks and the at least one tank in a future delivery by transmitting information identifying the subset of tanks and the at least one tank to a computing device associated with the commodity provider and presenting information identifying locations and commodity levels associated with the subset of tanks and the at least one tank to the commodity provider.

2. The method of claim 1, wherein selecting a subset of tanks from among the plurality of tanks comprises receiving a commodity delivery request from a user associated with a first tank of the plurality of tanks and selecting the subset of tanks to include the first tank.

3. The method of claim 1, wherein presenting information identifying locations and commodity levels associated with the subset of tanks and the at least one tank comprises presenting, on a display, a visual representation of locations associated with the subset of tanks and the at least one tank on a map.

4. The method of claim 3, wherein presenting a visual representation comprises displaying identifiers positioned on the map corresponding to the locations associated with the subset of tanks and the at least one tank, wherein each identifier indicates an amount of commodity stored in a tank at the location corresponding to the position of the identifier on the map.

5. The method of claim 1, further comprising determining a schedule for delivering the commodity to the subset of tanks and the at least one tank by receiving information identifying locations associated with the subset of tanks and the at least one tank and determining the schedule based on the locations associated with the subset of tanks and the at least one tank.

6. The method of claim 5, wherein determining a schedule for delivering the commodity further comprises calculating estimated costs associated with a plurality of schedules for delivering the commodity to the subset of tanks and the at least one tank, and selecting a schedule from the plurality of schedules having the lowest estimated cost.

7. The method of claim 6, wherein determining the schedule based on the locations associated with the subset of tanks and the at least one tank comprises identifying a group of tanks from the subset of tanks and the at least one tank by estimating distances for a provider to travel to the locations associated with the subset of tanks and the at least one tank and selecting the group of tanks as being geographically located in proximity to each other based on the estimated distances.

8. The method of claim 6, wherein determining a schedule for delivering the commodity comprises receiving travel time information associated with the plurality of schedules and calculating estimated costs associated with the plurality of schedules based on the travel time information.

9. The method of claim 1, wherein monitoring commodity usage for each of the plurality of tanks comprises detecting a commodity level for a tank by a Hall Effect sensor positioned at the tank and transmitting information indicating the commodity level over a wireless network via a transmitter in communication with the Hall Effect sensor.

10. The method of claim 9, wherein transmitting information indicating the commodity level over the wireless network occurs automatically.

* * * * *